United States Patent
Aune et al.

(10) Patent No.: US 11,112,819 B2
(45) Date of Patent: Sep. 7, 2021

(54) METHOD OF CLOCK GATE ANALYSIS FOR IMPROVED EFFICIENCY OF ELECTRONIC CIRCUITRY SYSTEM DESIGNS AND RELATED SYSTEMS, METHODS AND DEVICES

(71) Applicant: Microchip Technology Incorporated, Chandler, AZ (US)

(72) Inventors: Amund Aune, Trondheim (NO); Odd Magne Reitan, Heimdal (NO); Vitalii Marchuk, Tiller (NO); Andreas Onsum, Tiller (NO)

(73) Assignee: Microchip Technology Incorporated, Chandler, AZ (US)

( * ) Notice: Subject to any disclaimer, the term of this patent is extended or adjusted under 35 U.S.C. 154(b) by 208 days.

(21) Appl. No.: 16/228,445

(22) Filed: Dec. 20, 2018

(65) Prior Publication Data
US 2020/0073433 A1    Mar. 5, 2020

Related U.S. Application Data

(60) Provisional application No. 62/723,589, filed on Aug. 28, 2018.

(51) Int. Cl.
*G06F 1/10* (2006.01)

(52) U.S. Cl.
CPC ...................... *G06F 1/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,781,783 | A * | 7/1998 | Gunther | G06F 1/3228 700/295 |
| 6,232,820 | B1 * | 5/2001 | Long | G06F 1/10 327/374 |
| 6,636,074 | B2 * | 10/2003 | Schulz | G06F 1/3203 326/136 |
| 6,822,481 | B1 * | 11/2004 | Srikantam | G06F 1/3203 326/93 |
| 9,928,323 | B2 | 3/2018 | Wilson | |
| 2009/0217068 | A1 * | 8/2009 | Fernsler, Jr. | G06F 9/3869 713/322 |
| 2009/0282377 | A1 | 11/2009 | Tamiya | |
| 2014/0325461 | A1 | 10/2014 | Moheban et al. | |

OTHER PUBLICATIONS

International Search Report for International Application No. PCT/US2019/046213, dated Nov. 19, 2019, 4 pages.
International Written Opinion for International Application No. PCT/US2019/046213, dated Nov. 19, 2019, 11 pages.

* cited by examiner

*Primary Examiner* — Raymond N Phan
(74) *Attorney, Agent, or Firm* — TraskBritt

(57) ABSTRACT

Systems and methods described in this disclosure relate, generally, to analyzing electronic circuitry, and more specifically, to analyzing efficiency of clock gating in electronic circuitry. Analysis may include identifying wasted propagation of clock signals by clock gates and/or for a circuitry as a whole. In some embodiments, modified gating logic may be determined that improves clock gating efficiency, for example, by eliminating at least some wasted propagation of clock signals.

34 Claims, 8 Drawing Sheets

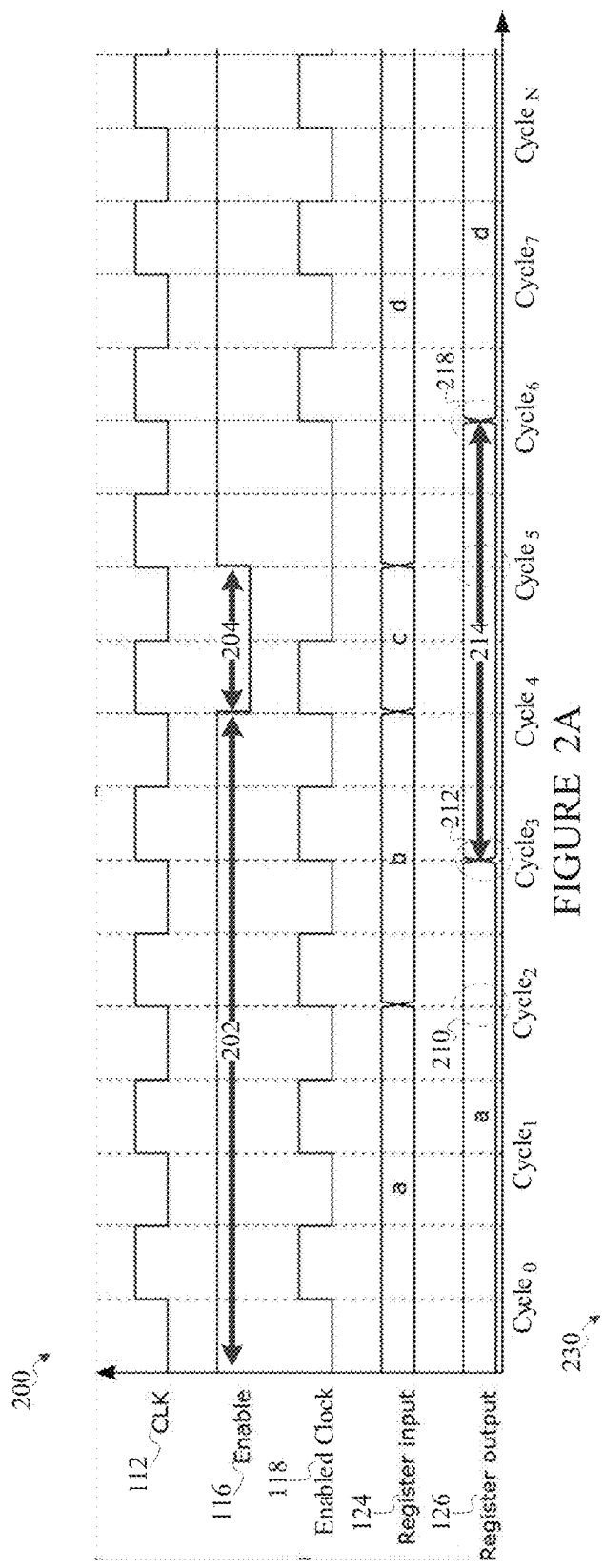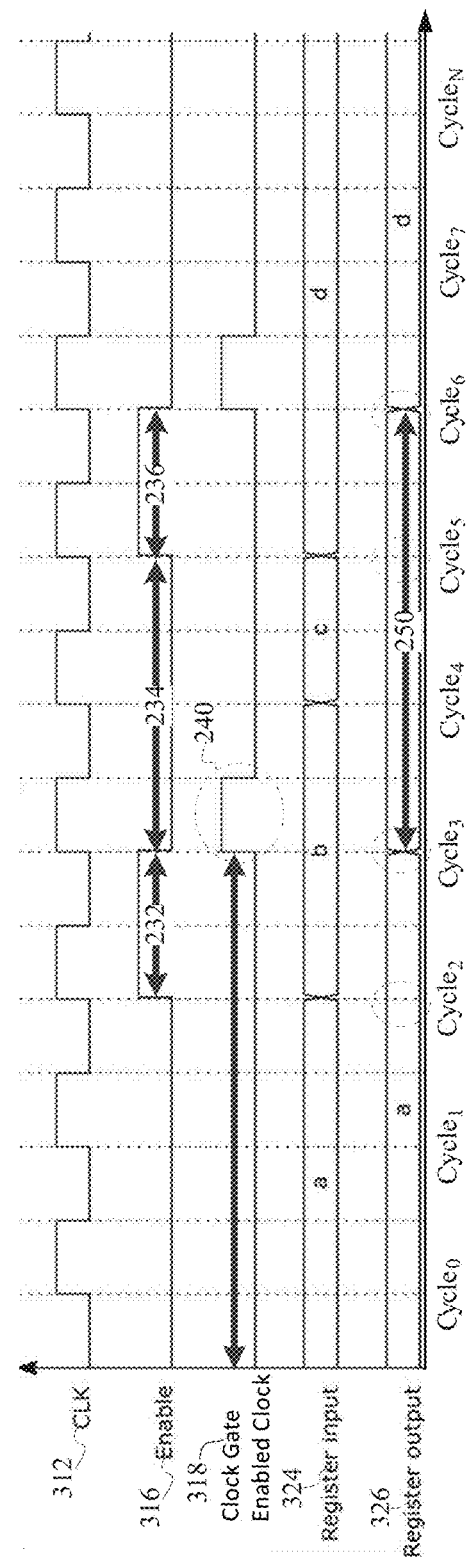

METHOD OF CLOCK GATE ANALYSIS FOR IMPROVED EFFICIENCY OF ELECTRONIC CIRCUITRY SYSTEM DESIGNS AND RELATED SYSTEMS, METHODS AND DEVICES

CROSS-REFERENCE TO RELATED APPLICATION

This application claims the benefit under 35 U.S.C. § 119(e) of U.S. Provisional Patent Application Ser. No. 62/723,589, filed Aug. 28, 2018, the disclosure of which is hereby incorporated herein in its entirety by this reference.

TECHNICAL FIELD

Embodiments of this disclosure relate, generally, to analysis of clock gates in electronic circuitry designs, and more specifically, in some embodiments to analysis of clock gates inserted into electronic circuitry designs by electronic circuitry design tools.

BACKGROUND

Electronic circuitry design tools, such as tools for electronic computer-aided design and electronic design automation, are commonly used for design of electronic systems. For example, design and/or evaluation of electronic circuits, integrated circuits, application-specific integrated circuits, and printed circuit boards. The designs they generate are used for many purposes including, manufacturing of semiconductor devices as well as programming design functionality into configurable programmable logic blocks such as used in field-programmable gate arrays (FPGAs).

Prior to manufacture or release of an electronic system, electronic circuitry designs are typically evaluated and verified. Evaluation and verification typically involves performing a simulation of an electronic circuitry design to analyze a function (or functions) of a system—i.e., given a set of inputs does a system generate the expected output? In addition, a simulation may be used to measure an efficiency of a system according to predefined metrics, including related to power consumption. By way of example, clocking registers of an integrated circuit when there is no change in data stored at those registers is an inefficient use of power by an electronic circuitry design.

Clock gating is a technique used in synchronous circuits to reduce power dissipation. It saves power by adding logic to circuitry (i.e., a "clock gate") to disable portions of the circuitry so that clocks are disabled to flip-flops or other downstream logic in the circuitry that do not, or are not intended to, switch states. Electronic circuitry design tools will sometimes insert thousands of clock gates into an electronic circuitry design. However, the inventors of this disclosure now understand that if incorrectly configured or if a use-case is marginal, then a clock gate may save less power than a correctly configured clock gate, or, in some cases, a clock gate may cost more power than it saves.

The inventors of this disclosure have recognized a need for methods of analysis of clock gates in electronic circuitry designs, and more specifically, analysis of clock gates inserted into electronic circuitry designs by electronic circuitry design tools.

BRIEF DESCRIPTION OF THE DRAWINGS

Purposes and advantages of the embodiments of the disclosure will be apparent to one of ordinary skill in the art from the detailed description in conjunction with the appended drawings, including:

FIG. 2A shows a timing diagram that corresponds to a contemplated operation of the electronic circuitry of FIG. 1.

FIG. 2B shows a timing diagram that corresponds to an improved electronic circuitry, in accordance with one or more embodiments of the disclosure.

DETAILED DESCRIPTION

Figure 1:
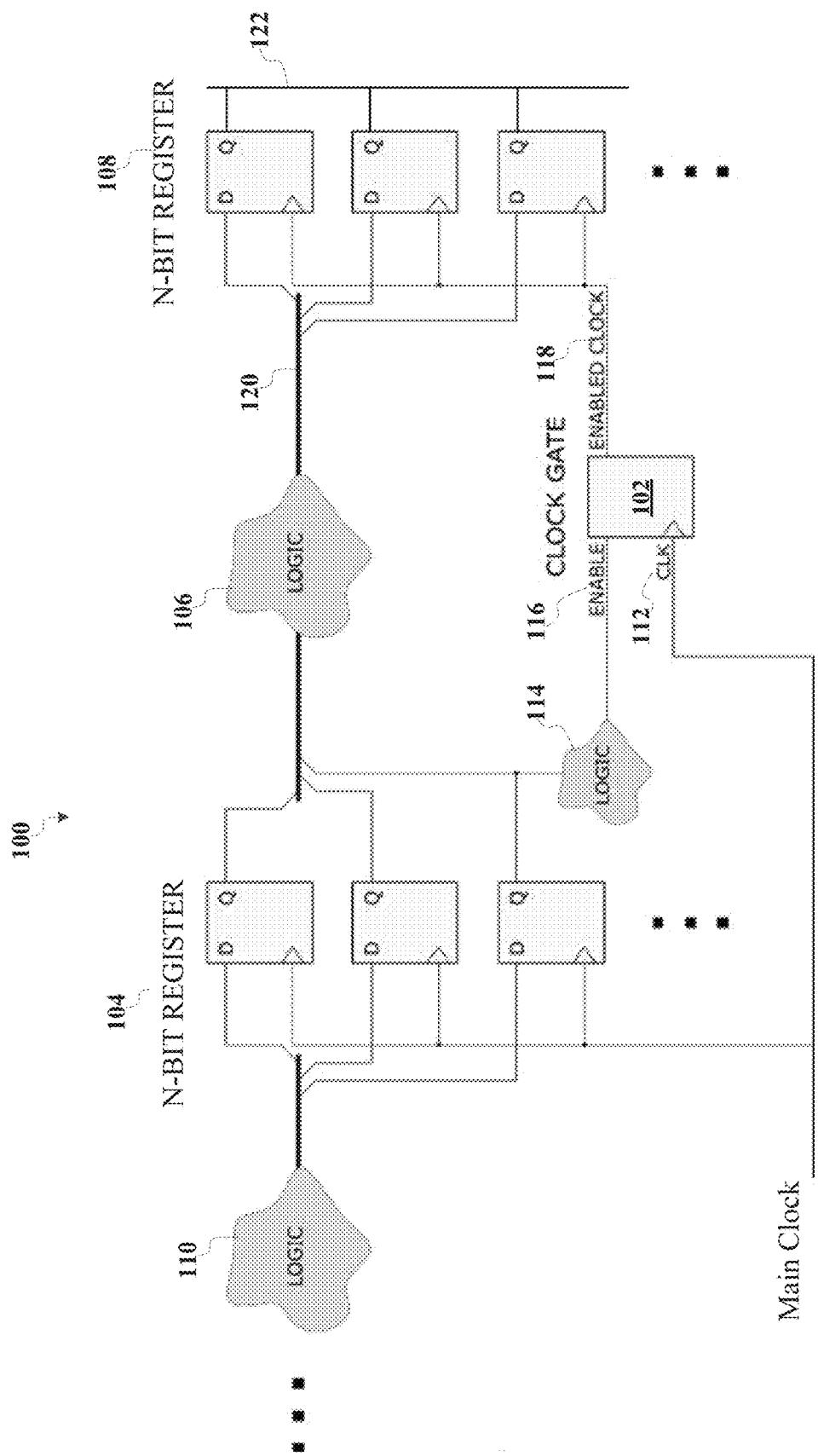
FIG. 1 shows a simplified circuit diagram of an example electronic circuitry that has not been improved in accordance with one or more embodiments of the disclosure.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary," "by example," "for example," "e.g.," and the like means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

As used herein a "gated-device" is circuitry within an electronic system that may be enabled/disabled and that includes synchronous circuitry. Examples of synchronous circuitry include synchronous combinational logic such as flip-flops, a register and a latch. In the case of a register, a gated-device may be part of a register, for example, the least-significant-bits of a register (e.g., a subset of a number of flip-flops that form a register).

As a matter of convention, a gated-device may be described herein as "driven" when it receives a clock. Moreover, a clock gate may drive a gated-device or groups of gated-devices in its fan out when propagating a clock. Notably, a first clock gate may "drive" gated-devices in its fan but that does not mean some or even all such gated-devices receive a clock signal—for example, one or more clock gates may be in a clock path between such first clock gate and various gated-devices.

In some cases, a clock gate may be described herein in terms of a state, e.g., "open" or "closed," operationally, e.g., "propagating" and "not propagating," and combinations thereof.

As used herein, a "clock" is a signal that oscillates between high and low states. Often an amplitude of a "high" and a "low" as well as a frequency of oscillation are predictable, but that is not necessarily always the case. By way of example, a clock may be used to coordinate actions of an electronic system and the circuitry of an electronic system. In this disclosure, for consistency of description, edge-triggered circuits should be assumed to be "low-to-high" or "rising-edge" triggered, and level-triggered circuits should be assumed to be "open" when a clock level is high. However, one of ordinary skill in the art will understand that any number of conventions may be used to trigger a circuit based on a clock.

A clock cycle is a time period measured from a first triggering event to a next triggering event. In the case of rising-edge triggered circuitry of this disclosure, the next triggering event may be the immediately successive rising-edge, or some multiple, e.g., every $2^{nd}$, every $3^{rd}$, without limitation. A period of time may be expressed in terms of number of clock cycles. For example, a relevant period may be expressed as two clock cycles long, three clock cycles long, etc. A number of successive clock cycles that form a period may be described as a series of clock cycles.

Typical electronic circuitry design tools insert clock gates into electronic circuitry designs without considering usage, notwithstanding that clock gates consume power and use physical space. Electronic circuitry design tools may configure a clock gate to disable a gated-device for many potential reasons. Electronic circuitry design tools may configure a clock gate to control (as used herein, controlling a gated-device refers to both enabling and disabling a gated-device) a gated-device to account for a clock stabilizing, but may not consider other conditions where clock-gating would improve efficiency. For example, it may not be efficient for a clock gate to propagate a clock if a gated-device is not changing state (e.g., changing stored information in the case of registers).

One or more embodiments of the disclosure relate, generally, to a method of analyzing clock-gating in an electronic circuitry design. During a simulation of an electronic circuitry design, for a given clock gate, state changes in one or more gated-devices in a fan-out of the clock gate are observed and compared to operation of the clock gate—that is, whether the clock gate is propagating the clock while gated-devices should change state and propagating a clock while gated-devices should not change state. If a propagating period overlaps with idle period(s) at gated-devices (i.e., corresponds to one or more of the same clock cycles), and a change to a propagating period would improve efficiency of an electronic circuitry design, then a clock gate may be reconfigured based on, at least in part, a desired change to a propagating period. Characterized another way, if changes to when a clock is enabled to reach a gated-device and disabled to reach a gated-device would improve efficiency of an electronic circuitry design then clock gate control logic may be reconfigured based on, at least in part, such timing information.

One or more embodiments of the disclosure relate, generally, to a clock gate analyzer (the "CGAnalyzer") configured for clock gating analysis of an electronic circuitry design. The CGAnalyzer may build a gating model associated with an electronic circuitry design, creates clock gating analysis parameters that are usable for simulation of the electronic circuitry design, and performs clock gating analysis during simulation of the electronic circuitry design. The CGAnalyzer may simulate and analyze each clock gate in an electronic circuitry design, and/or analyze simulation results of a simulator. The CGAnalyzer may output the results in human and/or computer-readable format that identifies clock gates based on efficiency thresholds. In one embodiment, the CGAnalyzer may output changes to a configuration of analyzed clock gates that would result in higher efficiency. The CGAnalyzer may compare an output of a simulation of an electronic circuitry design having reconfigured clock gates to an output of a simulation of an original electronic circuitry design to verify that an electronic circuitry design does not behave differently with a reconfigured clock gates/clock gating logic.

An example clock-gating analysis will now be described with reference to FIGS. 1, 2A, 2B, and 3, in accordance with one or more embodiments of the disclosure.

FIG. 1 shows a simplified circuit diagram of an example electronic circuitry 100 that has not been improved in accordance with one or more embodiments of the disclosure, and which may be a complete electronic circuitry or part of a larger, more complex, electronic system. Circuitry 100 includes clock gate 102, N-bit register 104 and gated-device 108 (which is also an N-bit register and may sometimes be referred to herein as "N-bit register 108"). A cloud of combinational logic 110 is operatively coupled to an input of N-bit register 104, and another cloud of combination logic 106 is operatively coupled between N-bit register 104 and N-bit register 108. N-bit register 108 may be considered a gated-device, and flip-flops that form N-bit register 108 may each individually be considered a gated-device.

Also operatively coupled between N-bit register 104 and N-bit register 108 are gating logic 114 and clock gate 102. Clock gate 102 is also operatively coupled to a main clock that supplies clock 112 for the circuitry 100. Clock gate 102 is configured to receive, at one or more inputs, enable 116 supplied by gating logic 114 and clock 112 supplied by the main clock. Clock gate 102 is configured to supply an enabled clock 118 to N-bit register 108. In a contemplated operation, clock gate 102 is configured to switch between propagating and gating modes responsive to enable 116 and/or clock 112, where clock gate 102 propagates clock 112 during a propagating mode and gates clock 112 during a gate mode, i.e., clock gate 102 does not propagate clock 112 during gate mode. Notably, clock gate 102 is a simplified block diagram of a clock gate in accordance with embodiments of this disclosure. Common elements such as a flip-flops, AND gates, and other combinational logic are not necessarily called out in discussion and figures for clock gates in this disclosure, but, for avoidance of doubt, as used herein "clock gate" is intended to include all arrangements for clock gates, and legal equivalents thereof, even if certain elements are not mentioned.

Clock gate 102 is configured to supply enabled clock 118 to one or more gated-devices in its fan out, including N-bit register 108. N-bit register 108 is operatively coupled to clock gate 102 such that individual register elements (e.g., flip-flops) may be clocked by enabled clock 118. First bus 120 is operatively coupled between computational logic 106 and N-bit register 108, and supplies data to N-bit register 108. Additional buses may be operatively coupled between an output of N-bit register 108 and downstream elements from circuitry 100, and be configured to transmit information. A second bus (e.g., second bus 122) is shown operatively coupled between N-bit register 108 and whatever circuitry is downstream.

FIG. 2A shows an example timing diagram 200 that corresponds to a contemplated operation of circuitry 100, in accordance with one or more embodiments of the disclosure. Shown are signals for clock 112, clock gate enable 116, and enabled clock 118. Also shown are register input 124 and register output 126. Clock cycles are shown along an axis of the timing diagram 200 (i.e., $Cycle_0$-$Cycle_N$). These labels align with rising edges of clock 112 and denote a start of an indicated clock cycle and an end of a previous clock cycle.

Generally, activity along a data path (e.g., logic 110, N-bit register 104, logic 106, N-bit register 108, etc.) is observed, and used to configure the clock path (e.g., enabled clock 118).

In one or more embodiments, register output 126, which corresponds to a signal on second bus 122, may be observed to determine when N-bit register 108 is active and inactive. Activity may be detected responsive to detected state changes at register output 126 over a number of clock cycles. By way of example, second bus 122 may be operatively coupled to an output of N-bit register 108, and state changes based on, at least in part, register output 126 may be observed at the second bus 122.

Register input 124 corresponds to a signal on first bus 120, and is shown for informational purposes, but is not necessarily used to detect activity at N-bit register 108.

Simply by way of explanation, register input 124 would not be used for clock gating analysis because when a clock gate is open, an input and an output of a register is (or will become) identical in relevant cases. When a clock gate is closed, a register input could be different from a register output.

Enabled clock 118 is active during a propagating period 202 that is defined by enable 116 being asserted (e.g., high). During the propagating period 202, enabled clock 118 and clock 112 are substantially the same although there may sometimes be a small propagation delay. A gating period 204 follows the propagating period 202, and is defined by enable 116 being negated (e.g., low). One clock cycle following the beginning of gating period 204, enabled clock 118 becomes inactive, and enabled clock 118 is inactive for a same number of clock cycles (one) as a length of the gating period 204.

Turning to register output 126, notably, after activity at state 212 (in this example, a change from signal "a" to signal "b"), register output 126 is in an idle period 214 where no activity is associated with N-bit register 108 (e.g., no information is changing on the outputs of these gated-devices, N-bit register 108 holds input "b" but is not clocked for input "c"), and so N-bit register 108 may also be characterized as being in idle period 214 (which may also be characterized as a "static" period) until a second activity 218. To detect activity at register output 126, a state at each clock cycle may be observed and then compared to the state of the previous clock cycle. For example, state 212 at Cycle$_3$ may compared to state 210 at Cycle$_2$, and a changed state may be detected responsive to detecting a difference between state 212 and state 210.

So, a portion of propagating period 202 that overlaps with idle period 214 is potentially wasted propagation time and an opportunity to improve operation of clock gate 102. Clock gating logic may be configured based on the wasted propagation time. This and other wasted propagation time may be recorded, for example, clock cycles associated with start and end times of wasted propagation times may be observed and stored.

FIG. 2B shows a timing diagram 230 that corresponds to an improved circuitry 300 (see FIG. 3), which may be created (or a design for which may be created) based on clock gating analysis described in this disclosure. FIG. 2B shows an example of a contemplated operation of improved circuitry 300, and how that contemplated operation is an improvement over pre-improved circuitry 100. Shown are signals for clock 312, clock enable 316, and clock gate enabled clock 318. Also shown are buses 320 and 322, which, in the example shown in FIG. 2B, are observed to determine register input 324 and register output 326, where register input 324 corresponds to a signal on bus 320 and register output 326 corresponds to a signal on bus 322.

Referring to clock enable 316, there is a short propagating period 232 followed by a gating period 234 and then another short propagating period 236. Due to modified gating logic 314, which will be described further in relation to FIG. 3, that supplies clock enable 316 to clock gate 302, gating period 234 corresponds more closely to idle period 250 of register output 326 as compared to gating period 204 and idle period 214. Notably, clock cycle 240 of clock gate enabled clock 318 is propagated, but no other clock cycles of clock 312 are propagated during idle period 250 as compared to the timing diagram 200 shown in FIG. 2A where two clock cycles are propagated during idle period 214. Also notably, in the example shown in FIGS. 2A and 2B, signal change "b" to "c" at register input 324 is purposefully suppressed by clock gate logic 314, which clock gate logic 314 comprises logic 314-1 and logic 314-2, for gating period 234.

A consistency check may be performed that shows that activity of register input 124 and register output 126 for the gating logic 114 of circuitry 100 is the same as register input 324 and register output 326 for modified gating logic 314 of improved circuitry 300. For example, state changes at register output 126 for corresponding clock cycles may be observed and determined to be consistent with state changes at register output 326, and, thus, a contemplated operation of improved circuitry 300 is consistent with a contemplated operation of circuitry 100.

Figure 3:
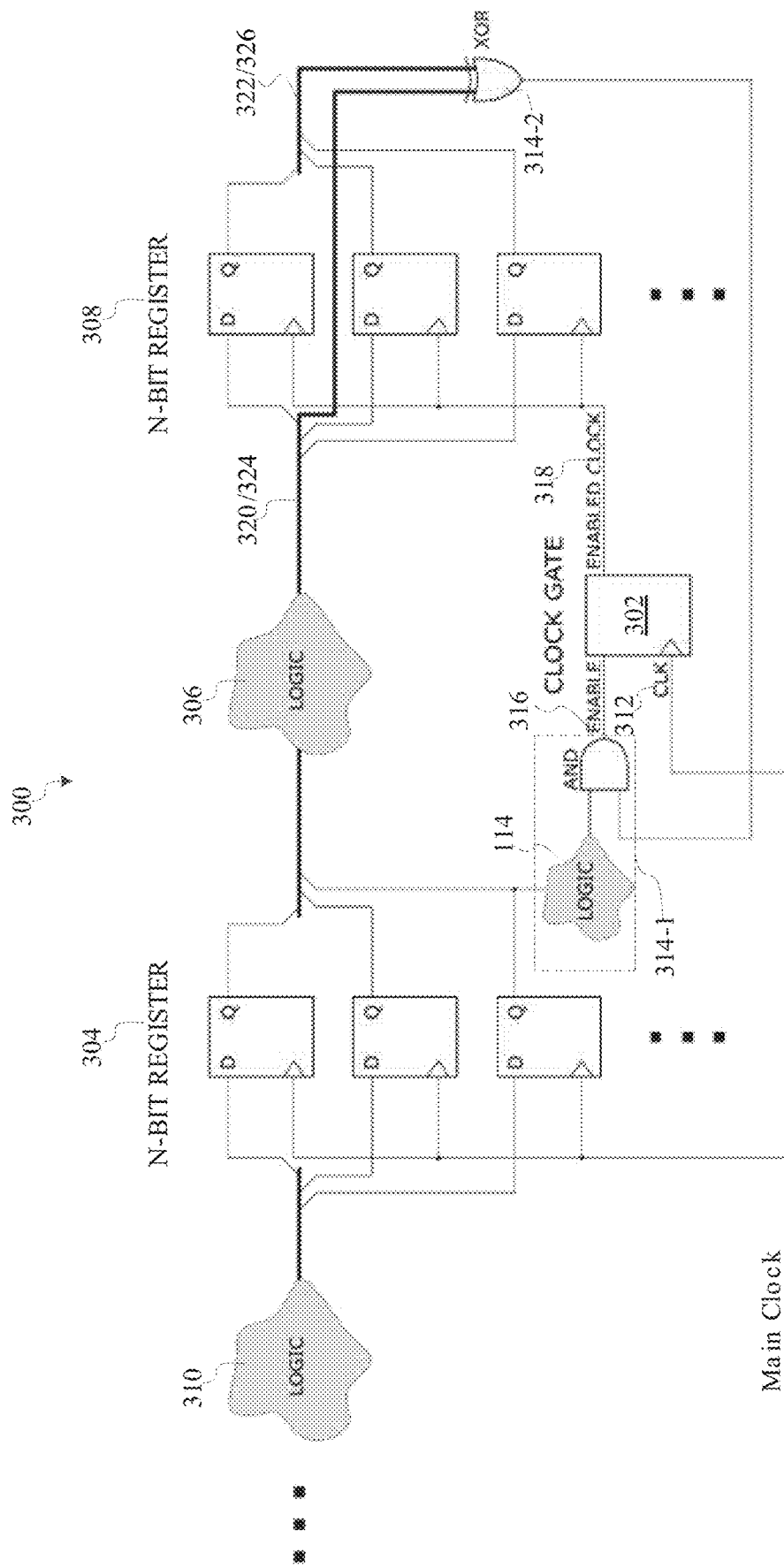
FIG. 3 shows a simplified circuit diagram of an example improved electronic circuitry that corresponds to the timing diagram of FIG. 2B.

FIG. 3 shows a simplified circuit diagram of an example improved circuitry 300, in accordance with one or more embodiments of the disclosure. Notably, improved circuitry 300 is one example of a generalized circuitry that may be created based on a clock gating analysis of this disclosure. One of ordinary skill in the art would understand that many other circuitries may be used to achieve a similar improvement in clock gating efficiency from circuitry 100 to improved circuitry 300.

FIG. 3 depicts logic 310, N-bit register 304, logic 306, and N-bit register 308. Improved circuitry 300 includes modified gating logic 314, which supplies clock enable 316, and is responsible for the differences between the gating periods and propagating periods shown in FIG. 2A and FIG. 2B. Notably, modified gating logic 314 is illustrated in a simplified format and comprises logic 314-1 and logic 314-2. Logic 314-2 is an XOR gate configured to output a "1" if any of the input signals to N-bit register 308 are different from a corresponding output signal of N-bit register 308, and a "0" if all of the input signals to N-bit register 308 are the same as a corresponding output signal of N-bit register 308. Logic 314-1 is (previous) gating logic 114 and an AND gate, and the AND gate receives an output of logic 314-2 and an output of gating logic 114. This is a simplified example to illustrate a contemplated example, and one of ordinary skill in the art would understand it could be represented by other combinations of combinational logic.

One technique for selecting new gating logic is to observe an exclusive-or (XOR) operation between a data input and a data output of a flip flop. Only when an input and an output differ does a clock need to be supplied. One advantage of such a technique is to save power. However, a circuitry design may take into account many different considerations and combinations of considerations, including power usage, timing, signal strength, etc. For example, if an enable signal is supplied from a finite state machine (FSM), the FSM may be redesigned to only output an enable at a time a state is changing (e.g., data is changing).

Clock gating analysis techniques and clock gating improvement techniques that are described in this disclosure may be implemented in hardware, software, and combinations thereof. Moreover, they may be used to analyze an electronic circuit or parts of an electronic circuit, for example, implemented in a configurable processor, a field-programmable-gate array, or analog circuits; and also to analyze a design of an electronic circuit such as may be described in a logic gate model.

Figure 4:
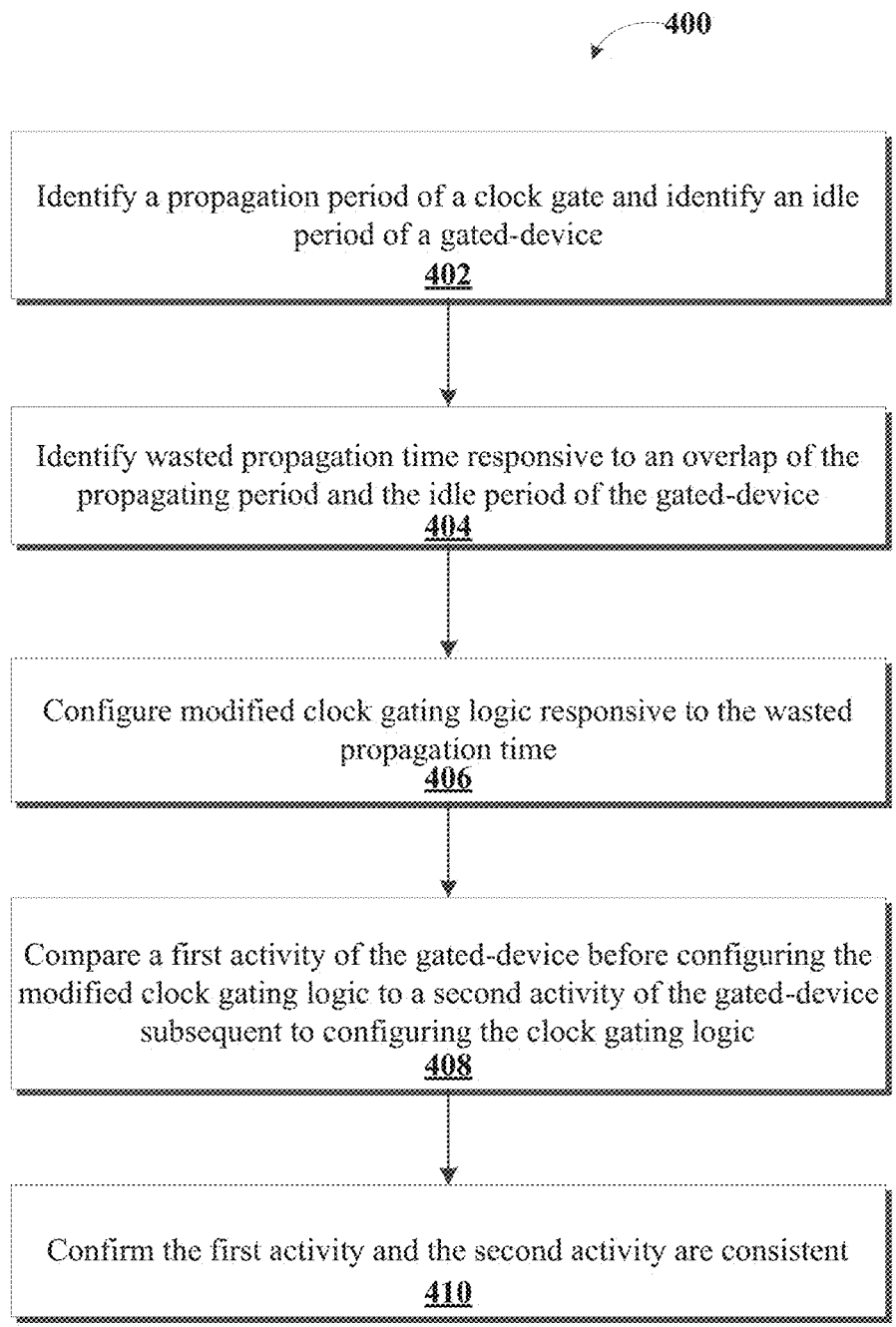
FIG. 4 shows a flowchart of a clock-gating analysis process, in accordance with one or more embodiments of the disclosure.

FIG. 4 shows a flowchart of a clock gating analysis process 400, in accordance with one or more embodiments of the disclosure. In operation 402, a propagating period of a clock gate and an idle period of a gated-device are identified. In one embodiment, an idle period may correspond to a period of inactivity at a gated-device, which may be detected by observing bus lines operatively coupled to a gated-device. In operation 404, wasted clock propagation time is identified responsive to an overlap of a propagating period and an idle period. Wasted clock propagation time may be identified and recorded, for example, using a start time and a stop time. Notably, a propagating period may actually comprise multiple propagating periods and an idle period may comprise multiple idle periods, and so multiple periods of overlap and multiple periods of wasted propagation time may be identified. In operation 406, modified clock gating logic is configured responsive to the wasted propagation time. In some cases, a clock gate may be a particular element in a standard cell library and there may be many types of clock gates with different behavior (e.g., associated clock gating logic). In one embodiment, a list of clock gates and their associated behavior may be used to identify candidate clock gates and then a standard cell library may be searched for the candidate clock gates. If available, a candidate clock gate may be investigated to see if it improves operation of a circuitry, and, more specifically, clock gating efficiency.

In operation 408, a first activity of the gated-device before configuring the modified clock gating logic is compared to a second activity of the gated-device subsequent to configuring the modified clock gating logic. In operation 410, the first activity and the second activity are confirmed to be consistent.

In one or more embodiments, a clock gate analyzer may simulate electronic circuitry for all relevant devices (e.g., clock gates and gated-devices) without using a sampling period—in other words, sampling for all signaling changes. However, in some cases there may be a trade-off in simulation efficiency. More particularly, the more complex a circuitry in terms of number clock gates and/or gated-devices, and the more signaling changes that are tracked, then the higher the cost in storage space (e.g., to store waveforms), processing power, and/or simulation run time.

So, in one or more embodiments, a clock gate analyzer may first simulate clock gates without using a specific sampling period, in other words, sampling for all signaling changes. A clock gate analyzer may determine relevant clock frequencies and/or sampling periods for simulation of all relevant devices (e.g., clock gates and/or gated-devices) based on results of the first simulation. A second simulation may be performed for all relevant devices using the determined frequencies and/or sampling periods. Notably, using the determined sampling period to simulate all relevant devices has a lower cost than simulating all relevant gated-devices for all signaling changes.

Figure 5:
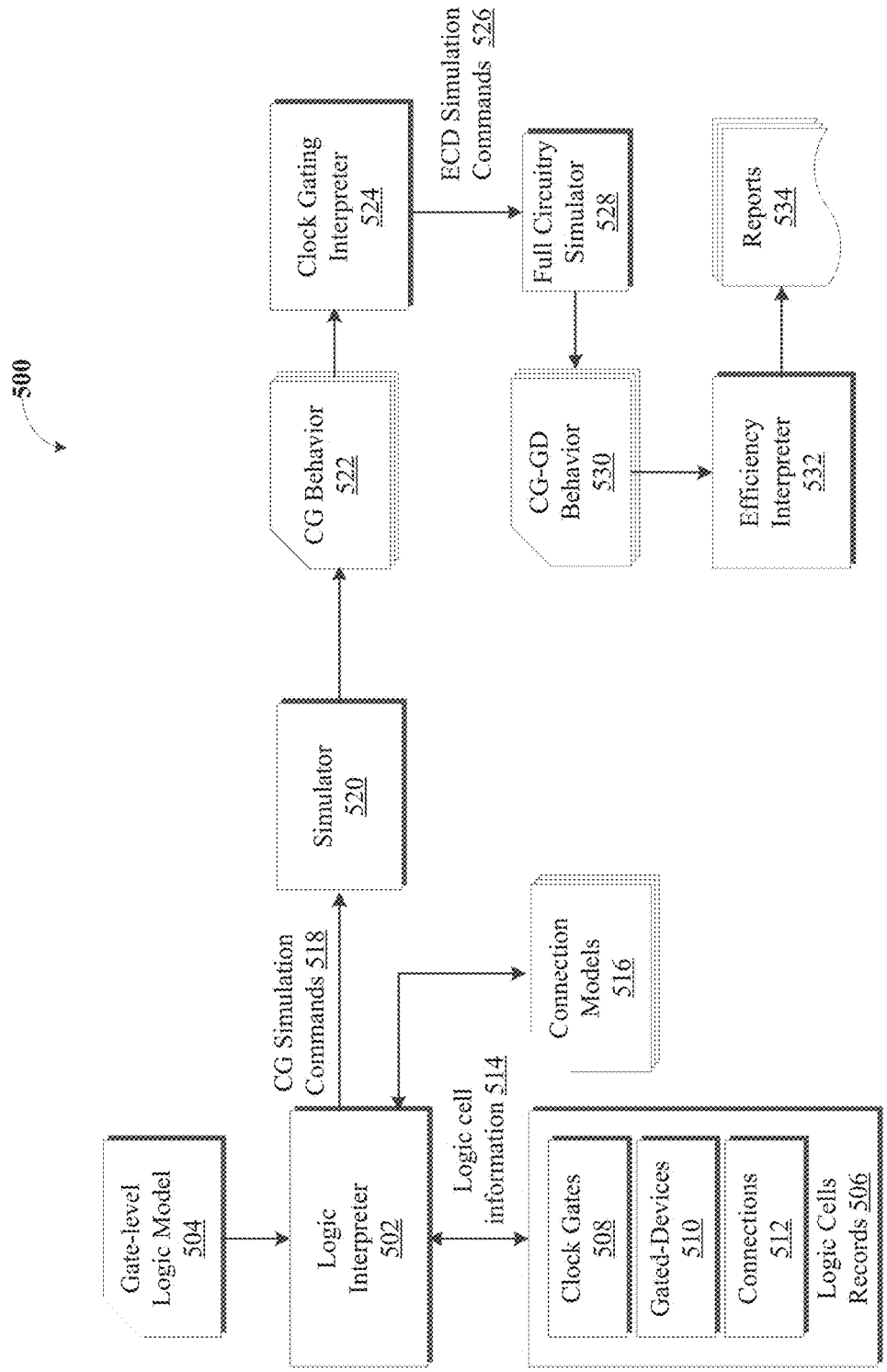
FIG. 5 shows a functional block diagram of an example clock-gating analyzer, in accordance with one or more embodiments of the disclosure.

FIG. 5 shows a functional block diagram of an example embodiment of a clock gate analyzer 500 configured, generally, to analyze clock gating for an electronic circuitry (such as circuitry 100 of FIG. 1), in accordance with one or more embodiments of the disclosure. More specifically, clock gate analyzer 500 may be configured to analyze clock gating associated with an electronic circuitry design, for example, a gated level logic implementation (e.g., a gated level netlist file in Verilog) inferred from a behavioral design of an electronic system (e.g., a System Verilog file), for example, using a compiler.

In the example shown in FIG. 5, clock gate analyzer 500 includes, generally, logic interpreter 502, simulator 520, clock gating interpreter 524, full circuitry simulator 528, and efficiency interpreter 532. Logic interpreter 502 may be configured to interpret a gate-level logic model 504 to identify logic cells, extract logic cell information, and provide logic cell information to populate logic cells records 506.

Logic cells records 506 may include fields for pre-defined logic cell types, including clock gates 508, gated-devices 510, and connections 512. In one embodiment, logic cells records 506 may also store information about timing elements, such as buffers (not shown). In one or more embodiments, gate-level logic model 504 may describe connectivity and behavior of components of an electronic circuitry design. In other embodiments, gate-level logic model 504 may describe connectivity (e.g., a list of cells, nodes, and/or some attributes of cells), and logic interpreter 502 may also include a description (e.g., library files) of behaviors for one or more cells that are described in the gate-level logic model 504.

Connectivity in a gate-level logic model 504 may describe a physical connection (e.g., a wire) or a signal and a signal path (e.g., a signal and an identifier for a connected device that receives the signal).

In one embodiment, logic interpreter 502 may include a terminology table that describes naming conventions used for different types of logic cells in gate-level logic models, including gate-level logic model 504. In one embodiment, a terminology table may be, or based on, a standard cell library. Logic interpreter 502 may use terminology described in the terminology table to identify clock gates, gated-devices, and connections described in gate-level logic model 504 and extract logic cell information 514. Logic cell information 514 may include full modules (e.g., detailed sub-blocks and high-level functionality that encapsulates the sub-blocks) as well as instance paths and wire aliases for each module.

Logic interpreter 502 may be configured to parse gate-level logic model 504 to identify clock gates and trace connectivity (e.g., wires or signals) from a clock output of a clock gate to every gated-device that is driven (i.e., the clock output of the clock gate is received at a clock input of the gated-device) by the clock gate. Information about each clock gate and gated-device(s) it drives may be stored by logic interpreter 502 as extracted logic cell information 514 in logic cells records 506. Logic interpreter 502 may use terminology described in a terminology table to identify clock gates, gated-devices, and connections described in gate-level logic model 504 and extract logic cell information 514.

Logic interpreter 502 stores the logic cell records 506 in a connection model 516, which includes a description of clock gates and the gated-devices that they drive.

In addition to extracting logic cell information 514 from gate-level logic model 504, logic interpreter 502 is configured to generate clock gate (CG) simulation commands 518, which are parsed commands for running a simulation of relevant clock gates at simulator 520. CG simulation commands 518 may include simulation commands, a sampling frequency determined by logic interpreter 502, and a gate-level logic model 504. Logic interpreter 502 may determine CG simulation commands 518 based on connectivity and behavior information stored in connection model 516. In one embodiment, CG simulation commands 518 may be stored as a command file.

Simulator 520 is configured to output clock gate (CG) behavior 522 (e.g., waveforms) of relevant clock gate signals, responsive to CG simulation commands 518, and more specifically, gate-level logic model 504, simulation commands, and sampling frequency. CG behavior 522 may describe signals that may be logged and analyzed in more detail to understand an impact of clock gates in the electronic circuitry design.

CG behavior 522 may also include state information for all connections whenever a connection changes state during an analysis period. In one or more embodiments, sampling periods (e.g., corresponding to sampling frequencies as noted above) may be defined to simplify clock gate and/or clock gate and gated-device simulation and analysis.

In one or more embodiments, clock gating interpreter 524 may be configured to determine a sampling frequency to be used during a second simulation (e.g., by full circuitry simulator 528) using CG behavior 522. Because a frequency of a system clock can change or a system clock may have different clocks with different frequencies during an analysis period, in one embodiment, clock gating interpreter 524 identifies a sampling frequency for which no, or inconsequential, data will be missed (e.g., will not be logged).

Any suitable technique known to those having ordinary skill in the art may be used to identify one or more sampling frequencies. For example, according to a general identification process contemplated in this disclosure, logic interpreter 502 identifies a "lowest" clock frequency $f_s$ and a "highest" clock frequency $f_f$ during an analysis period, determines a multiple m of that "lowest" clock frequency that is the same or faster than the identified "highest" clock frequency, and then defines a sampling frequency as $m \times f_s$ for analyzing a circuitry (which may also be referred to as a sampling rate, and having a corresponding sampling period).

According to another general identification process contemplated in this disclosure, logic interpreter 502 identifies all clock frequencies during an analysis period, determines a lowest-common-multiple (LCM) frequency of the clock frequencies, and defines an analysis frequency as an LCM frequency.

To identify clock frequencies (whether all or just the lowest and highest frequencies), in one embodiment, for each clock gate for which an analysis run is performed over an analysis period, clock gating interpreter 524 may be configured to identify greatest common divisors of clock frequencies of sub-periods of the whole analysis period. In one embodiment, relevant sub-periods may be found by checking a timestamp for each toggle of a clock and recording a time interval between each such timestamp. For example, if there is a first toggle at time t1 and a second toggle at time t2, then time elapsed between t1 and t2 may be recorded as a found half-period, where a found period would be from rising-edge to rising-edge.

Clock gating interpreter 524 may be configured to generate ECD simulation commands 526 and provide ECD simulation commands 526 to full circuitry simulator 528. ECD simulation commands 526 may include, for example, all relevant signals for simulating relevant devices (e.g., clock gates and gated-devices) and sampling frequencies for simulating relevant devices.

A series of descriptions of clock gate and gated-device (CG-GD) behavior 530 are output by full circuitry simulator 528 in response to ECD simulation commands 526. For each clock gate, a CG-GD behavior 530 may describe a series of waveforms output by the clock gate and waveforms output by gated-devices in its fan out.

Each waveform of CG-GD behavior 530 (e.g., each waveform file) may be analyzed by efficiency interpreter 532. Efficiency interpreter 532 may be configured to check, for each clock gate: (1) how many cycles in a row a clock gate is driving gated-devices; and (2) an efficiency of a clock gate by measuring the number of clock cycles during propagating periods gated-devices are idle or active. Efficiency interpreter 532 may also be configured to determine a number of gated-devices in its fan out, for example, by looking at a number of connections.

Notably, since a period for a clock that is propagated by a clock gate could vary, efficiency interpreter 532 may be configured to detect active clock edges, and to check for activity at gated-devices responsive to detected active clock edges.

In one or more embodiments, evaluation information may be collected for each clock gate, compared, and stored, and then output in a human and/or computer-readable format in report 534, which may be stored.

In one or more embodiments, each of logic interpreter 502, CG interpreter 524, and efficiency interpreter 532 may be a computer program (e.g., a compiled program in object code), a script written in a scripting language, and combinations thereof (e.g., a script that controls or invokes one or more computer programs, and vice versa).

While simulators, such as simulator 520 and full circuitry simulator 528, are shown and described as separate functional blocks, in one or more embodiments they may be part of the same functional module or software package. Moreover, an analysis process may be described herein, generally, as a first simulation where clock gates and signals they provide are identified based on the first simulation and then clock gates, signals they provide, and gated-devices, are more fully monitored and analyzed in a second simulation. However, in one or more embodiments, clock gates and gated-devices may be analyzed together.

Figure 6:
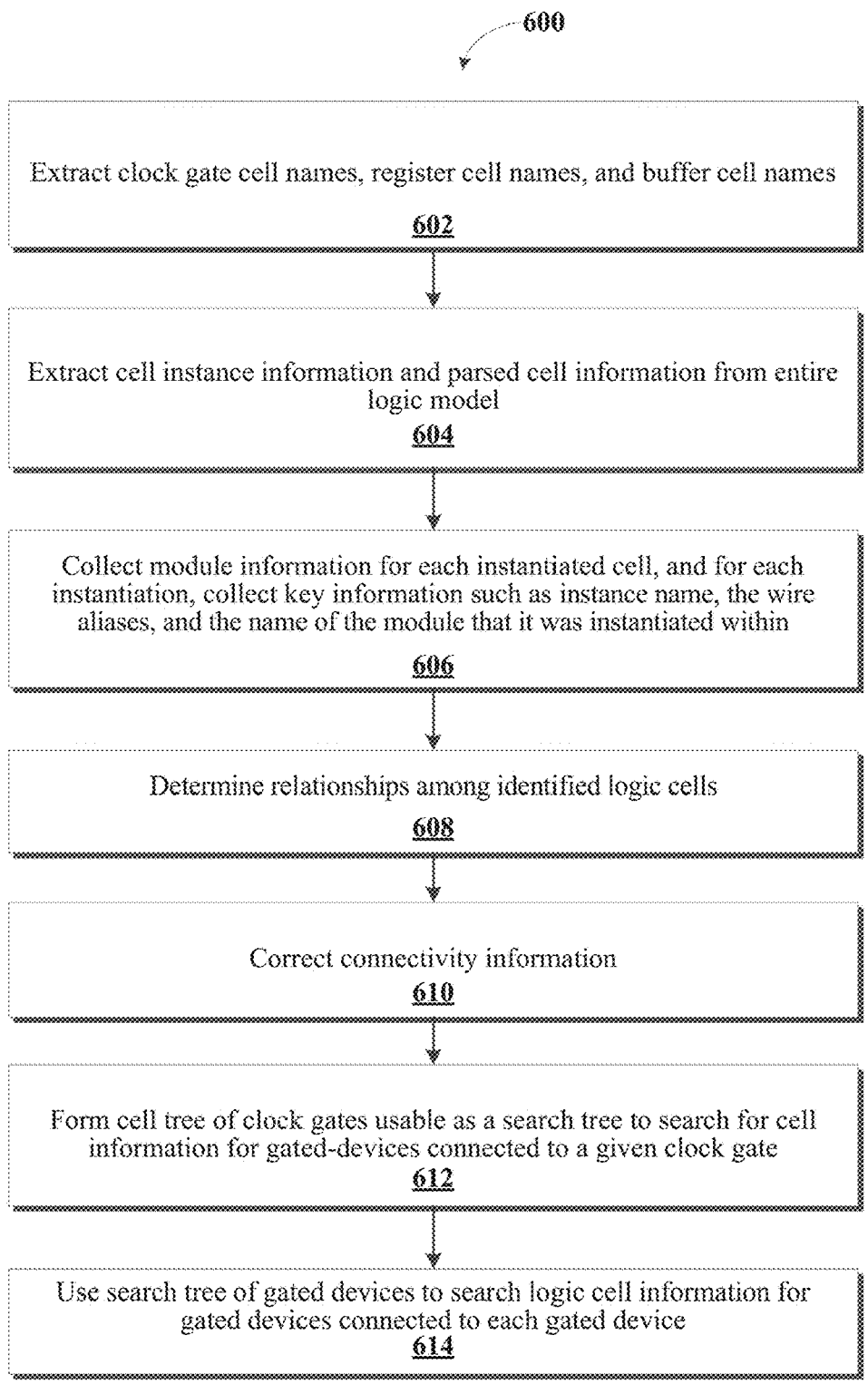
FIG. 6 shows a flowchart of an example combinational logic interpretation process, in accordance with one or more embodiments of the disclosure.
Figure 7:
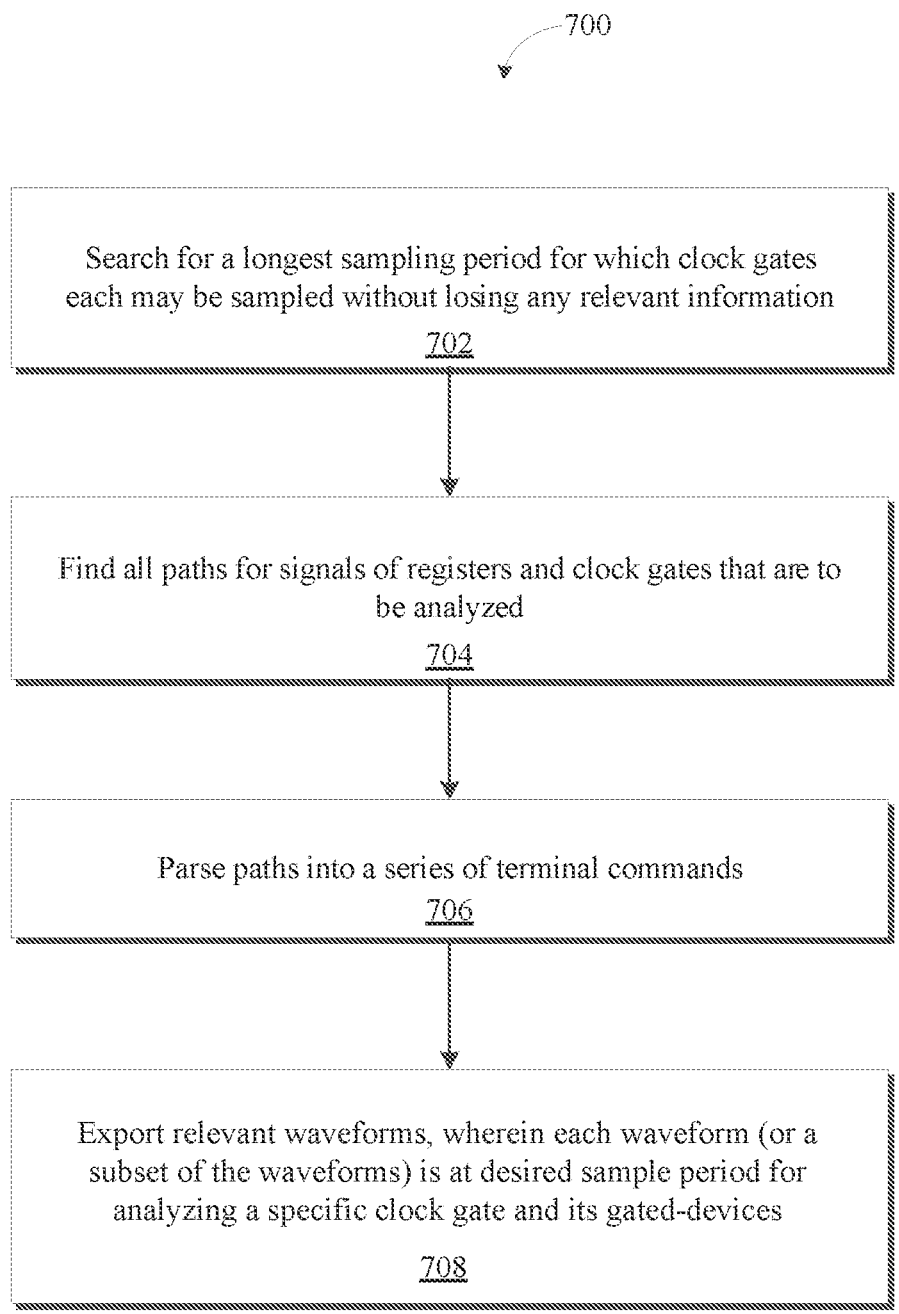
FIG. 7 shows a flowchart of an example clock gating interpretation process, in accordance with one or more embodiments of the disclosure.
Figure 8:
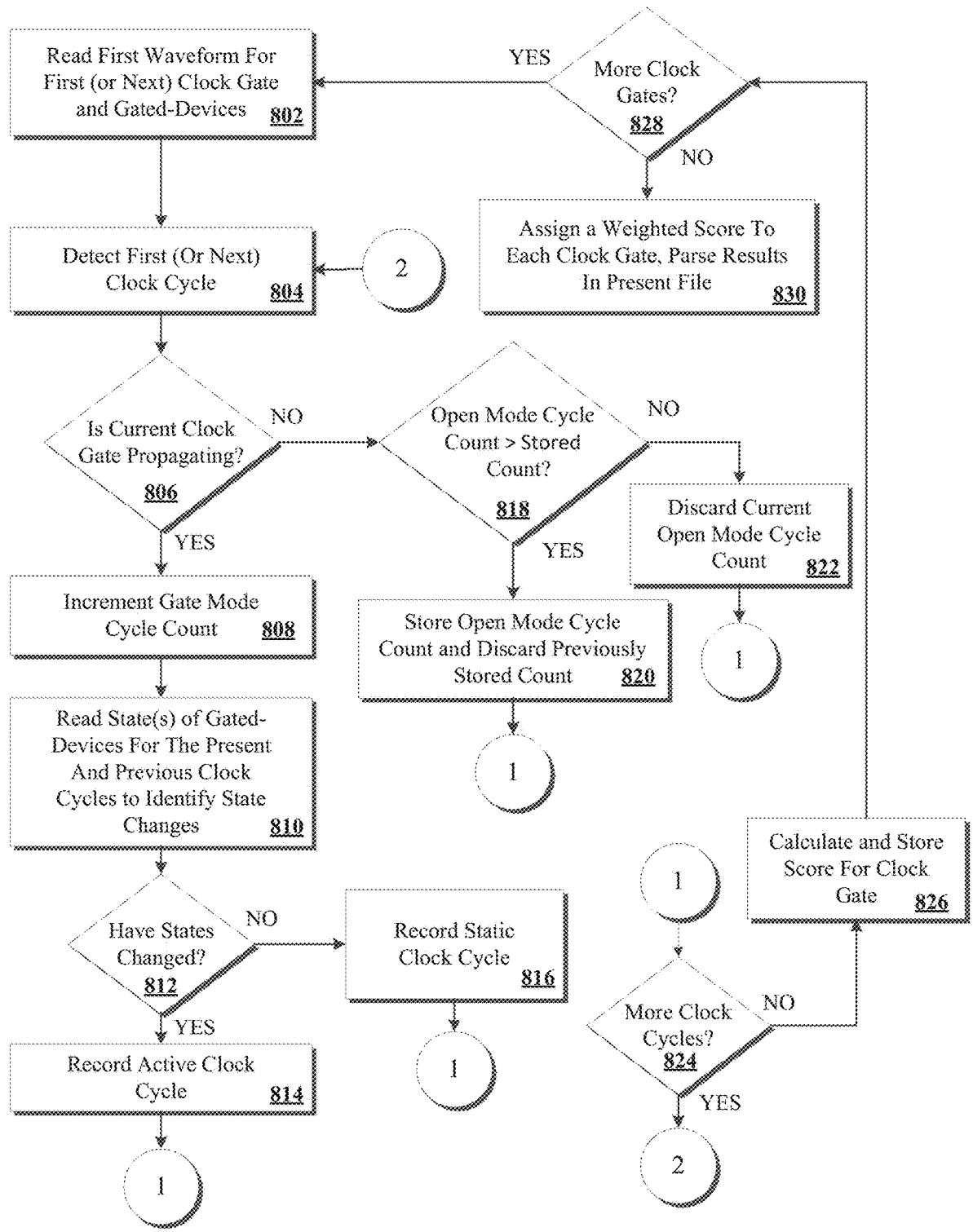
FIG. 8 shows a flowchart of an example efficiency interpretation process, in accordance with one or more embodiments of the disclosure.

FIGS. 6, 7 and 8 show flow-charts for example interpretation processes 600, 700 and 800 implemented as scripts for logic interpreter 502, CG interpreter 524, and efficiency interpreter 532, respectively, in accordance with one or more embodiment of the disclosure.

FIG. 6 shows a flow chart of an example logic interpretation process 600 (performed, for example, by logic interpreter 502), in accordance with one or more embodiments of the disclosure. In operation 602, clock gate cell names, register cell names, and buffer cell names, one by one or in combination, are used as arguments (i.e., to define a parameter) for cell types of interest, and a logic model is searched for the cell types of interest. In operation 604, bottom level instantiations of logic cells corresponding to each logic cell type name is returned. In one embodiment, a bottom level instantiation is a place in a netlist where a logic cell is picked from a standard cell library, and is hence the only place where the cell's module name is used. The whole netlist is parsed and all the logic cell instances corresponding to logic cell type names are collected. In operation 606, each module of which a cell was instantiated is identified and a module's name is collected. Each place where a module name is called upon later is checked within a logic model, and key information is extracted. In one embodiment, key information is an instance name, wire aliases, and a name of the module that it was instantiated within. In some cases, modules may be nested (modules within modules within modules), in which case a module name may be a module path of nested modules.

After extracting key information about logic cell types, in operation 608, relationships among identified logic cells are determined. Since the key information has been acquired about the input and output wires for logic cell for all the different places that it is used within an electronic circuitry design, connections among the logic cells may be identified based on the key information. In operation 610, extracted cell information is provided and cleaned to ensure correct formatting for identified connections. In operation 612, a cell tree of clock gates is formed and used as a search tree to search the cell information for gated-devices connected to a given clock gate.

In operation 614, a cell tree is stepped through one clock gate at a time to search lists of cell information. All logic cells are returned for gated-devices coupled (e.g., that are supplied an enabled clock signal ("ENCLK signal") from a clock gate as an input clock signal) to a given clock gate, for example, register, or another clock gate, and the logic cell information for the identified logic cells is stored. Each such gated-device is recorded as gated by the particular clock gate.

By way of a contemplated example, in one or more embodiments, all buffers that are supplied (e.g., coupled to) an ENCLK signal from a particular clock gate are found. An output wire of each such buffer is recorded. The output wire is then viewed as equivalent to an ENCLK signal. A cell-tree is stepped through again, one clock gate at a time, to search cell information and identify gated-devices and buffers supplied by the ENCLK signal. Newly identified gated-devices are recorded as well as newly identified buffers, which are viewed as equivalent to an ENCLK signal. This process is repeated until no more buffers are identified and it is assumed that all gated-devices have been found and stored for a clock gate as its found gated-devices.

In one or more embodiments, when a gated-device is found, such as a register, a gated-device identifier (e.g., a number of several digits) is stored in a list together with a clock gate identifier to show that clock gate and gated-device are connected. In one embodiment, a gated-device identifier is a number corresponding to a location in a gated-device list the particular gated-device can be found. When a gated-device is found, that branch of that clock tree is no longer necessary for more logic cells connected to a gated-device's output since a gated-device does not propagate a clock signal, meaning that logic cells connected to a gated-device's output are not driven by the respective clock gate.

FIG. 7 shows a flowchart of an example clock gating interpretation process 700, in accordance with one or more embodiments of the disclosure.

In operation 702, a longest sampling period for which clock gates each may be sampled without losing any relevant information is searched for and identified. In operation 704, all paths for signals of registers and clock gates that are to be analyzed are found. Each path may be described as a position for a particular cell in a circuitry design, and, more particularly, may be described in a list of nested modules that the particular cell is located within. In operation 706, the paths are parsed into as a series of terminal commands. A terminal command of the series of terminal commands may be a command to perform a simulation of a single clock gate and its associated gated-devices (e.g., driven registers). The command may include specific instructions for running an electronic circuitry design in a simulator (e.g., for a commercially available simulation engine), the path for each relevant device (here, each relevant cell), and a sampling frequency and/or sampling period. In operation 708, relevant waveforms are exported wherein each waveform (or subset of the waveforms) is at desired sample period for analyzing a specific clock gate and its gated-devices.

In one or more embodiments, to find a desired sample period, a correct waveform for each clock gate is found (i.e., specific to a clock gate), exported to a file, and searched line by line. Every clock edge is detected, and a time of a clock edge event is read and stored. For every time a rising clock edge has been detected, a time since a clock fell until a rising edge is recorded, and vice versa for the event of a falling edge. A resulting half-period is identified and stored. In one embodiment, the resulting-half period and other sample periods that are identified are added to a list of candidate sample periods. One or more greatest common divisors for half-periods may be found and appended to the list of candidate sample periods. Upon analyzing all the clock gates and completing a list of candidate sample periods, the list of candidate sample periods is returned. A list of candidate sample periods may be analyzed and appropriate sampling periods may be selected for simulating an electronic circuitry design, and selected sampling periods may be used to determine sampling frequencies.

A list of connections between the clock gates and registers may be used to create a terminal command to run a digital simulator. The correct paths for the signals that are needed in the terminal commands are also created. An output may be a file listing one terminal command for each of the clock gates. This file is read run one by one. A file (e.g., a comma separated values type file) is written out for each clock gate and stored, for example, in a directory of a file system or a database.

FIG. 8 shows a flowchart of an example efficiency interpretation process 800, in accordance with one or more embodiments of the disclosure. Generally, wave forms corresponding to simulated electronic circuit designs may be analyzed and dynamic efficiency information collected and stored. Dynamic efficiency information may include, for example, a number of clock cycles where a gated-device is active, a number of cycles where a gated-device is static and a clock-gate corresponding to such gated-device propagating a clock (an open state), a maximum number of consecutive cycles where the clock gate is propagating the clock, a number of gated and ungated-device in a circuitry, and a number of gated-devices in a fan out of a clock gate (e.g., stored as a list of connections to a clock gate). In one or more embodiments, clock-gates and gated-devices may be quantified (e.g., as a score) according to dynamic efficiency information, for example, using a raw score, a percentage, a ranking, and combinations thereof. For example, counts of gated versus ungated-devices; a dynamic efficiency score (e.g., in percentages) for clock gates, groups of clock gates, gated-devices, and groups of gated-devices calculated as a comparison of wasted propagating period versus total propagating period; and overall dynamic efficiency score (e.g., in percentages) for a circuit calculated using one or more of the foregoing dynamic efficiency scores.

Generally, a waveform file may be processed to collect dynamic efficiency information for tested criteria, e.g., a dynamic efficiency in terms of percent, a maximum number of consecutive cycles where a clock gate is open, and a number of gated-devices in a clock gates fan out. Since periods of samples may be shorter than a period of a clock, an edge detector may be implemented to determine when to read signals of interest. By way of a contemplated example, when a sampling frequency is higher than a clock frequency for a particular part of a waveform, each sample of a clock may be observed to determine if it is different than a previous sample of the clock—in other words, if there has been a change—i.e., activity. If the sample is different than the previous sample, then it may be inferred that is where an edge occurred (or within a number of clock cycles corresponding to a delay).

Turning to example efficiency interpretation process 800, in operation 802, a waveform is read for a first or next clock gate and its gated-devices (e.g., registers in its fan out). In operation 804, a first or next clock cycle is detected (e.g., using edge detection techniques) based on the waveform. In operation 806, it is determined whether the clock gate is in propagating mode of operation (also referred to herein as "open mode") for the current clock cycle (i.e., the detected first or next clock cycle in operation 802).

If, in operation 806, it is determined that the clock gate is in a propagating mode for the current clock cycle, then in operation 808 an open mode cycle count is incremented. The open mode cycle count is a count of a number of consecutive cycles that a clock gate is in a propagating mode—in other words, a measure of propagating cycles. In operation 810, states of gated-devices are read for the current clock cycle and the previous clock cycle to identify if states for such gated-devices have changed. In operation 812, the states of gated-devices for the current clock cycle and the previous clock cycle are compared, and it is determined if any state changes are detected. If register values have not changed (i.e., a register is static), then in operation 816 a static clock cycle is recorded—that is, a clock cycle is recorded where a clock gate was propagating but a gated-device was static. In one embodiment, recording a static cycle may include incrementing a static cycle count. If gated-device states have changed (i.e., a register is active), then in operation 814 an active cycle may be recorded. In one embodiment, recording an active cycle may include incrementing an active cycle count. After recording an active cycle (operation 814) or a static cycle (operation 816), as the case may be, in operation 824, it is determined there are more clock cycles to analyze for the current clock gate based on the waveform. If there are more clock cycles to analyze then process 800 loops back to operation 804 and detects the next clock cycle.

If, in operation 806, it is determined that a clock gate is in gate mode (i.e., not propagating a clock) for the current clock cycle then in operation 818 it is determined if a current open mode cycle count (which is also a count of consecutive propagating cycles) is larger than a previously stored open mode cycle count. If not larger, then in operation 822 the current open mode cycle count is discarded in favor of the previously stored open mode cycle count. If larger, then in operation 820 the previously stored open mode cycle count is discarded and the current open mode cycle count is stored. Upon analyzing a clock gate, a stored counter will correspond to a detected maximum number of consecutive cycles for which a clock gate is propagating. After storing or discarding the current open mode cycle count, as the case may be, in operation 824 it is determined there are more clock cycles to analyze for the current clock gate based on the waveform. If there are more clock cycles to analyze, then process 800 loops back to operation 804 and detects the next clock cycle.

If, in operation 824, it is determined that there are no more clock cycles to analyze, then, in operation 826, scores for a clock gate are calculated and stored. Scoring examples, such as dynamic efficiency scores, are described later in this disclosure. In operation 828, it is determined if there are more clock gates to analyze. If there are more clock gates to analyze, then, process 800 proceeds to operation 802 to read a next waveform for a next clock gate and its gated-devices.

If, in operation 824, it is determined that there are no more clock gates to analyze, then in operation 830, a weighted score is assigned to each clock gate (e.g., a weighting of dynamic efficiency score that represents its contribution to a score for an entire system), and results are parsed to a file and stored. Weighted scores may be used, among other ways, to compare clock gates to each other. For example, weighted scores may be used to determine which clock gates of a set of clock gates are the most inefficient based on a set of criteria. Weighting may involve determining which metrics are most important and assigning a weight (e.g., a value) to specific metrics. Importance may be determined, for example, based on contribution to factors such as contribution to power consumption. Metrics considered when determining weights may include number of consecutive clock cycles propagating and total number of cycles a clock gate receives an input (i.e., number of cycles where the clock gate is gated by another, closed, clock gate).

Process 800 is complete after performing operation 830.

A results script may be configured to create an output file, leading with general information about an electronic system design as a whole. General information may include, for example, an amount (e.g., a count) of ungated versus gated registers, a dynamic efficiency for gates and/or groups of gates (e.g., in a percentage), an overall average dynamic efficiency score (e.g., in a percentage), and dynamic efficiency information more generally.

After an overview, rated/scored lists for clock gates may be described. An amount of clock gates shown for each list may be given, for example, by user input, and pre-set to show a number of worst and best clock gates (e.g., in terms of dynamic efficiency), for example, set to show the ten worst clock gates and ten best clock gates.

By way of example, each entry starts with a clock gate name which is followed by a number for each tested criterion. A path for a clock gate may be shown, for example, in a netlist type display arrangement. At the bottom of an entry a path may be shown for each gated-device (e.g., register) that is driven by a clock gate. In one or more embodiments, register paths may be used to locate a clock gate within original RTL code, given that the clock gates are not physically inferred before the synthesis stage, i.e., in a netlist.

Report 1 is an example summary for a whole electronic system, generated in accordance with one or more embodiments of the disclosure:

Summary of Electronic System
Number of Registers (Total|Gated|Ungated): 4063|3366|697
Clock Gate Percentage Total: 82.85%
Dynamic Clock Gate Efficiency On Average in Percent: 3.39%

Report 2 is an example report for a clock gate that is reported to be the most inefficient of an electronic system, generated in accordance with one or more embodiments of the disclosure:
SNPS_CLOCK_GATE_HIGH-clkctr_oscel_sysclk:
Stationary for max 10512 cycles consecutively
Efficiency in percent: 0.00
Flip-flops in register: 4

→ ISYNT
  → i_sm
    → i_clkctrl_chip
      → i_clkctrl
        → i_oscsel_sysclk
          → i_oscsel_sysclk
            →
            clk_gate_sys_osc_en_reg_qual_reg_3_
Gate registers:
→ ISYNT
  → i_sm
    → i clkctrl_chip
      → i_oscsel_sysclk
        → sys_osc_en_reg-qual_reg_3_
→ISYNT
  → i_sm

```
    → i_clkctrl_chip
        → i_oscsel_sysclk
            → sys_osc_en_reg_qual_reg_2_
→ ISYNT
    → i_sm
        → i_clkctrl_chip
            → i_oscsel_sysclk
                → sys_osc_en_reg_qual_reg_1_
→ ISYNT
    → ism
        → i_clkctrl_chip
            → i_oscsel_sysclk
                → sys_osc_en_reg_qual_reg_0_
```

Report 3 is an example report for a clock gate that is reported to be the most efficient of another electronic system, generated in accordance with one or more embodiments of the disclosure:

SNPS_CLOCK_GATE_HIGH_port_busif_3_0_13:
Stationary for max 3 cycles consecutively
Efficiency in percent: 100.00
Flip-flops in register: 152

One of ordinary skill in the art will appreciate that there are many benefits and advantages associated with implementation of embodiments of the disclosure other than those specifically described.

While elements such as clock gates, combinational logic, gated-devices, buses and various connections may be described herein, one of ordinary skill in the art would understand that such elements and connections may be physical, such as part of circuitry, logical, such as defined in a design like a gate-level model, or both physical and logical, such as a design corresponding to circuitry. Examples and embodiments described in this disclosure should be interpreted to cover physical implementations and logical implementations, independently and in combination, and legal equivalents thereof, unless an example or embodiment is specifically stated to apply to one of a logical or physical implementation, or a context would be understood by one of ordinary skill in the art to apply to one of physical or logic implementations, in which case it covers such stated or understood implementation and legal equivalents thereof.

For at least the reasons set forth herein, various embodiments of the present disclosure provide a technical solution to one or more problems that arise from technology that could not reasonably be performed by a person. Various embodiments of the present disclosure provide technical advantages and technical solutions that are rooted in computer technology, overcome problems and/or disadvantages rooted in computer-related technology, and improve computer-related technology generally, including problems, disadvantages, and challenges described herein. Further, at least some embodiments disclosed herein may improve computer-related technology by allowing a computer to perform a function not previously performable by a computer.

Many of the functional descriptions in this specification may be illustrated, described or labeled as modules, threads, steps, or other segregations of programming code, including firmware, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software or firmware, stored on a physical storage device (e.g., a computer-readable storage medium which may also be referred to herein as simply a computer-readable medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical storage devices.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are flash memory and random-access-memory (RAM). Another example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

Software portions of modules may also be stored on computer-readable storage media for carrying or having computer-executable instructions or data structures stored thereon. Such computer-readable storage media may be any available media that may be accessed by a general-purpose or special-purpose computer.

Byway of example, and not limitation, such computer-readable storage media may include non-transitory storage media including Random Access Memory (RAM), Read-Only Memory (ROM), Electrically Erasable Programmable Read-Only Memory (EEPROM), Compact Disc Read-Only Memory (CD-ROM), or other optical disk storage (such as a digital video disc or "DVD"), magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media and storage mediums. Computer-executable instructions may include, for example, instructions and data configured to cause a processor to perform a certain operation or group of operations, including to perform the various embodiments of this disclosure.

The embodiments described herein may be embodied, wholly or partially, in one or more computer program products supplied on any one of a variety of computer-readable storage media. The computer program product(s) may be embodied in computer language statements.

The term "computer program product" is used to refer to a computer-readable storage media, as defined above, which has on it any form of software to enable a computer system to operate according to any embodiment of the invention. Software applications may include software for facilitating interaction with software modules, including user interface and application programming interfaces. Software may also be bundled, especially in a commercial context, to be built, compiled and/or installed on a local computer.

Additional non-limiting embodiments of the disclosure may include:

Embodiment 1: A method of analyzing an electronic system, comprising: identifying a propagating period of a clock gate; identifying an idle period of a gated-device operatively coupled to the clock gate; identifying a wasted propagation period responsive to an overlap of the propagating period and the idle period; configuring a modified clock gating logic responsive to the wasted propagation period; comparing a first activity of the gated-device to a second activity of the gated-device; and confirming the first activity and the second activity are consistent.

Embodiment 2: The method of Embodiment 1, wherein comparing the first activity of the gated-device to the second activity of the gated-device comprises: determining the first activity of the gated-device responsive to activity associated with the gated-device prior to configuring the modified clock gating logic; and determining the second activity of the gated-device responsive to activity associated with the gated-device subsequent to configuring the modified clock gating logic.

Embodiment 3: The method of Embodiments 1 and 2, wherein identifying an idle period of a gated-device comprises: identifying activity on a data path that corresponds to a clock path that includes the clock gate and the gated-device; and identifying the idle period responsive to the identified activity.

Embodiment 4: The method of any of Embodiments 1 to 3, wherein identifying the idle period comprises observing one or more state changes at an output of the gated-device.

Embodiment 5: The method of any of Embodiments 1 to 4, wherein identifying the idle period further comprises: identifying clock cycles corresponding to the observed state changes; and identifying a series of clock cycles between two consecutive state changes of the observed state changes.

Embodiment 6: The method of any of Embodiments 1 to 5, wherein identifying the propagation period of the clock gate comprises identifying a series of clock cycles during which the clock gate is propagating a received clock.

Embodiment 7: The method of any of Embodiments 1 to 6, wherein the identifying the wasted propagation period responsive to the overlap of the propagating period and the idle period comprises: identifying a first series of clock cycles corresponding to the propagating period of the clock gate; identifying a second series of clock cycles corresponding to the idle period of the gated-device; and identifying at least one clock cycle that is the same for the first series of clock cycles and the second series of clock cycles.

Embodiment 8: The method of any of Embodiments 1 to 7, wherein configuring the modified clock gating logic responsive to the wasted propagation period comprises configuring the modified clock gating logic to not propagate a received clock for at least some of the wasted propagation period.

Embodiment 9: A system for analyzing electronic circuitry, comprising: a non-transitory storage medium configured to store electronic files of waveforms corresponding to operation of clock gates and gated-devices of an electronic circuitry; a processor for processing the electronic files of waveforms stored at the non-transitory storage medium, wherein the processor is configured to: identify a propagating period of a clock gate; identify an idle period of a gated-device operatively coupled to the clock gate; identify a wasted propagation period responsive to an overlap of the propagating period and the idle period; configure a modified clock gating logic responsive to the wasted propagation period; compare a first activity of the gated-device to a second activity of the gated-device; and confirm the first activity and the second activity are consistent.

Embodiment 10: The system of Embodiment 9, wherein the processor is configured to compare the first activity of the gated-device to the second activity of the gated-device by: determining the first activity of the gated-device responsive to activity associated with the gated-device prior to configuring the modified clock gating logic; and determining the second activity of the gated-device responsive to activity associated with the gated-device subsequent to configuring the modified clock gating logic.

Embodiment 11: The system of Embodiments 9 and 10, wherein the processor is configured to identify the idle period of a gated-device by: identifying activity on a data path that corresponds to a clock path that includes the clock gate and the gated-device; and identifying the idle period responsive to the identified activity.

Embodiment 12: The system of any of Embodiments 9 to 11, wherein the processor is configured to identify the idle period by observing one or more state changes at an output of the gated-device.

Embodiment 13: The system of any of Embodiments 9 to 12, wherein the processor is configured to identify the idle period further by: identifying clock cycles corresponding to the observed state changes; and identifying a series of clock cycles between two consecutive state changes of the observed state changes.

Embodiment 14: The system of any of Embodiments 9 to 13, wherein the processor is configured to identify the propagation period of the clock gate by identifying a series of clock cycles during which the clock gate is open.

Embodiment 15: The system of any of Embodiments 9 to 14, wherein the processor is configured to identify the wasted propagation period responsive to the overlap of the propagating period and the idle period by: identifying a first series of clock cycles corresponding to the propagating period of the clock gate; identifying a second series of clock cycles corresponding to the idle period of the gated-device; and identifying at least one clock cycle that is the same for the first series of clock cycles and the second series of clock cycles.

Embodiment 16: The system of any of Embodiments 9 to 15, wherein the processor is configured to configure the modified clock gating logic responsive to the wasted propagation period by configuring the modified clock gating logic to close the clock gate for at least some of the wasted propagation period.

Embodiment 17: A computer program product, comprising: a computer-readable medium; and instructions stored on the computer-readable medium, the instructions configured to enable a processor to perform operations of: identifying a propagating period of a clock gate; identifying an idle period of a gated-device operatively coupled to the clock gate; identifying a wasted propagation period responsive to an overlap of the propagating period and the idle period; configuring a modified clock gating logic responsive to the wasted propagation period; comparing a first activity of the gated-device to a second activity of the gated-device; and confirming the first activity and the second activity are consistent.

Embodiment 18: The computer program product of Embodiment 17, wherein the instructions are configured to enable the processor to compare the first activity of the gated-device to the second activity of the gated-device by: determining the first activity of the gated-device responsive to activity associated with the gated-device prior to configuring the modified clock gating logic; and determining the second activity of the gated-device responsive to activity associated with the gated-device subsequent to configuring the modified clock gating logic.

Embodiment 19: The computer program product of Embodiments 17 and 18, wherein the instructions are configured to enable the processor to identify the idle period of a gated-device by: identifying activity on a data path that corresponds to a clock path that includes the clock gate and the gated-device; and identifying the idle period responsive to the identified activity.

Embodiment 20: The computer program product of any of Embodiments 17 to 19, wherein the instructions are configured to enable the processor to identify the idle period comprises observing one or more state changes at an output of the gated-device.

Embodiment 21: The computer program product of any of Embodiments 17 to 20, wherein the instructions are configured to enable the processor to identify the idle period further by: identifying clock cycles corresponding to the observed state changes; and identifying a series of clock cycles between two consecutive state changes of the observed state changes.

Embodiment 22: The computer program product of any of Embodiments 17 to 21, wherein the instructions are configured to enable the processor to identify the propagation period of the clock gate by identifying a series of clock cycles during which the clock gate is open.

Embodiment 23: The computer program product of any of Embodiments 17 to 22, wherein the instructions are configured to enable the processor to identify the wasted propagation period responsive to the overlap of the propagating period and the idle period by: identifying a first series of clock cycles corresponding to the propagating period of the clock gate; identifying a second series of clock cycles corresponding to the idle period of the gated-device; and identifying at least one clock cycle that is the same for the first series of clock cycles and the second series of clock cycles.

Embodiment 24: The computer program product of any of Embodiments 17 to 23, wherein the instructions are configured to enable the processor to configure the modified clock gating logic responsive to the wasted propagation period by configuring the modified clock gating logic to close the clock gate for at least some of the wasted propagation period.

Embodiment 25: A method of analyzing an electronic circuitry design, comprising: identifying logic cells comprising a gate-level logic model of an electronic circuitry design; generating first simulation commands for simulating the electronic circuitry design responsive to the identified logic cells; performing a first simulation responsive to generating the first simulation commands; identifying clock gate behavior responsive to performing the first simulation; generating second simulation commands for simulating the electronic circuitry design responsive to identifying the clock gate behavior; performing a second simulation responsive to generating the second simulation commands; collecting dynamic efficiency information for the electronic circuitry design responsive to performing the second simulation; and scoring one or more of the electronic circuitry design, clock-gates of the electronic circuitry design, and gated-devices of the electronic circuitry design responsive to collecting the dynamic efficiency information.

Embodiment 26: The method of Embodiment 25, wherein collecting dynamic efficiency information comprises collecting one or more of: a number of clock cycles where a gated-device is active; a number of cycles where a gated-device is static and a clock-gate corresponding to such gated-device is propagating a received clock; and a number of gated-devices in a fan out of a clock gate.

Embodiment 27: The method of Embodiments 25 and 26, wherein the generating the first simulation commands for simulating the electronic circuitry design responsive to the identified logic cells comprises: identifying clock gates described in the logic cells; and generating the first simulation commands responsive to the identified clock gates.

Embodiment 28: The method of any of Embodiments 25 to 27, wherein the generating the first simulation commands responsive to the identified clock gates comprises generating simulation commands for simulating signaling changes at the identified clock gates.

Embodiment 29: The method of any of Embodiments 25 to 28, wherein generating simulation commands for simulating signaling changes at the identified clock gates comprises: generating the simulation commands for simulating signaling changes at the identified clock gates but not for simulating signaling changes at other devices the electronic circuitry design.

Embodiment 30: The method of any of Embodiments 25 to 29, wherein identifying clock gate behavior responsive to performing the first simulation comprises identifying sampling frequencies for performing a simulation of clock gates and gated-devices of the electronic circuitry design.

Embodiment 31: The method of any of Embodiments 25 to 30, wherein identifying sampling frequencies for performing the simulation of the clock gate and the gated-devices of the electronic circuitry design comprises: identifying a lowest clock frequency and a highest clock frequency during an analysis period; and determining a second clock frequency responsive to the identifying the lowest clock frequency and the highest clock frequency during the analysis period.

Embodiment 32: The method of any of Embodiments 25 to 31, wherein determining the second clock frequency responsive to the identifying the lowest clock frequency and the highest clock frequency during the analysis period comprises: identifying a multiple of the lowest clock frequency that is the same or higher to the highest clock frequency; and defining the second clock frequency responsive to identifying the multiple of the lowest clock frequency.

Embodiment 33: The method of any of Embodiments 25 to 32, wherein identifying sampling frequencies for performing the simulation of the clock gate and the gated-devices of the electronic circuitry design comprises: identifying all clock frequencies during an analysis period; and determining a least-common multiple clock frequency responsive to identifying all clock frequencies during the analysis period.

Embodiment 34: The method of any of Embodiments 25 to 33, wherein generating second simulation commands for simulating the electronic circuitry design responsive to identifying the clock gate behavior comprises: generating simulation commands for simulating clock gates and gated-devices of the electronic circuitry using a sampling frequency.

Embodiment 35: A system configured to perform any of the operations of one or more of Embodiments 26 to 35.

Embodiment 36: A computer program product configured to perform any of the operations of one or more of Embodiments 26 to 35.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

What is claimed is:

1. A method of analyzing an electronic system, comprising:
    identifying propagating clock cycles of a clock gate;
    identifying idle clock cycles of a gated-device operatively coupled to the clock gate;
    identifying wasted propagation clock cycles responsive to an overlap of the propagating clock cycles and the idle clock cycles;
    configuring a modified clock gating logic responsive to the wasted propagation clock cycles;
    comparing a first activity of the gated-device to a second activity of the gated-device; and
    confirming the first activity and the second activity are consistent.

2. The method of claim 1, wherein comparing the first activity of the gated-device to the second activity of the gated-device comprises:
    determining the first activity of the gated-device responsive to activity associated with the gated-device prior to configuring the modified clock gating logic; and
    determining the second activity of the gated-device responsive to activity associated with the gated-device subsequent to configuring the modified clock gating logic.

3. The method of claim 1, wherein identifying idle clock cycles of a gated-device comprises:
    identifying activity on a data path that corresponds to a clock path that includes the clock gate and the gated-device; and
    identifying the idle clock cycles responsive to the identified activity.

4. The method of claim 1, wherein identifying the propagating clock cycles of the clock gate comprises identifying a series of clock cycles during which the clock gate is propagating a received clock.

5. The method of claim 1, wherein the identifying the wasted propagation clock cycles responsive to the overlap of the propagating clock cycles and the idle clock cycles comprises:
    identifying a first series of clock cycles corresponding to the propagating clock cycles of the clock gate;
    identifying a second series of clock cycles corresponding to the idle clock cycles of the gated-device; and
    identifying at least one clock cycle that is the same for the first series of clock cycles and the second series of clock cycles.

6. The method of claim 1, wherein configuring the modified clock gating logic responsive to the wasted propagation clock cycles comprises configuring the modified clock gating logic to not propagate a received clock for at least one of the wasted propagation clock cycles.

7. The method of claim 3, wherein identifying the idle clock cycles comprises observing one or more state changes at an output of the gated-device.

8. The method of claim 3, wherein identifying the idle clock cycles further comprises:
    identifying clock cycles corresponding to the observed state changes; and
    identifying a series of clock cycles between two consecutive state changes of observed state changes.

9. A system for analyzing electronic circuitry, comprising:
    a non-transitory storage medium configured to store electronic files of waveforms corresponding to operation of clock gates and gated-devices of an electronic circuitry;
    a processor for processing the electronic files of waveforms stored at the non-transitory storage medium, wherein the processor is configured to:
    identify propagating clock cycles of a clock gate;
    identify idle clock cycles of a gated-device operatively coupled to the clock gate;
    identify wasted propagation clock cycles responsive to an overlap of the propagating clock cycles and the idle clock cycles;
    configure a modified clock gating logic responsive to the wasted propagation clock cycles;
    compare a first activity of the gated-device to a second activity of the gated-device; and
    confirm the first activity and the second activity are consistent.

10. The system of claim 9, wherein the processor is configured to compare the first activity of the gated-device to the second activity of the gated-device by:
    determining the first activity of the gated-device responsive to activity associated with the gated-device prior to configuring the modified clock gating logic; and
    determining the second activity of the gated-device responsive to activity associated with the gated-device subsequent to configuring the modified clock gating logic.

11. The system of claim 9, wherein the processor is configured to identify the propagation clock cycles of the clock gate by identifying a series of clock cycles during which the clock gate is open.

12. The system of claim 9, wherein the processor is configured to identify the wasted propagation clock cycles responsive to the overlap of the propagating clock cycles and the idle clock cycles by:

identifying a first series of clock cycles corresponding to the propagating clock cycles of the clock gate;
identifying a second series of clock cycles corresponding to the idle clock cycles of the gated-device; and
identifying at least one clock cycle that is the same for the first series of clock cycles and the second series of clock cycles.

13. The system of claim 9, wherein the processor is configured to configure the modified clock gating logic responsive to the wasted propagation clock cycles by configuring the modified clock gating logic to close the clock gate for at least one of the wasted propagation clock cycles.

14. The system of claim 10, wherein the processor is configured to identify the idle clock cycles of a gated-device by:
identifying activity on a data path that corresponds to a clock path that includes the clock gate and the gated-device; and
identifying the idle clock cycles responsive to the identified activity.

15. The system of claim 14, wherein the processor is configured to identify the idle clock cycles comprises observing one or more state changes at an output of the gated-device.

16. The system of claim 14, wherein the processor is configured to identify the idle clock cycles further by:
identifying clock cycles corresponding to observed state changes; and
identifying a series of clock cycles between two consecutive state changes of observed state changes.

17. A computer program product, comprising:
a computer-readable medium; and
instructions stored on the computer-readable medium, the instructions configured to enable a processor to perform operations of:
identifying propagating clock cycles of a clock gate;
identifying idle clock cycles of a gated-device operatively coupled to the clock gate;
identifying wasted propagation clock cycles responsive to an overlap of the propagating clock cycles and the idle clock cycles;
configuring a modified clock gating logic responsive to the wasted propagation clock cycles;
comparing a first activity of the gated-device to a second activity of the gated-device; and
confirming the first activity and the second activity are consistent.

18. The computer program product of claim 17, wherein the instructions are configured to enable the processor to compare the first activity of the gated-device to the second activity of the gated-device by:
determining the first activity of the gated-device responsive to activity associated with the gated-device prior to configuring the modified clock gating logic; and
determining the second activity of the gated-device responsive to activity associated with the gated-device subsequent to configuring the modified clock gating logic.

19. The computer program product of claim 17, wherein the instructions are configured to enable the processor to identify the propagation clock cycles of the clock gate by identifying a series of clock cycles during which the clock gate is open.

20. The computer program product of claim 17, wherein the instructions are configured to enable the processor to identify the wasted propagation clock cycles responsive to the overlap of the propagating clock cycles and the idle clock cycles by:
identifying a first series of clock cycles corresponding to the propagating clock cycles of the clock gate;
identifying a second series of clock cycles corresponding to the idle clock cycles of the gated-device; and
identifying at least one clock cycle that is the same for the first series of clock cycles and the second series of clock cycles.

21. The computer program product of claim 17, wherein the instructions are configured to enable the processor to configure the modified clock gating logic responsive to the wasted propagation clock cycles by configuring the modified clock gating logic to close the clock gate for at least one of the wasted propagation clock cycles.

22. The computer program product of claim 18, wherein the instructions are configured to enable the processor to identify the idle clock cycles of a gated-device by:
identifying activity on a data path that corresponds to a clock path that includes the clock gate and the gated-device; and
identifying the idle clock cycles responsive to the identified activity.

23. The computer program product of claim 22, wherein the instructions are configured to enable the processor to identify the idle clock cycles comprises observing one or more state changes at an output of the gated-device.

24. The computer program product of claim 22, wherein the instructions are configured to enable the processor to identify the idle clock cycles further by:
identifying clock cycles corresponding to observed state changes; and
identifying a series of clock cycles between two consecutive state changes of the observed state changes.

25. A method of analyzing an electronic circuitry design, comprising:
identifying logic cells comprising a gate-level logic model of an electronic circuitry design;
generating first simulation commands for simulating the electronic circuitry design responsive to the identified logic cells;
performing a first simulation responsive to generating the first simulation commands;
identifying clock gate behavior responsive to performing the first simulation;
generating second simulation commands for simulating the electronic circuitry design responsive to identifying the clock gate behavior;
performing a second simulation responsive to generating the second simulation commands;
collecting dynamic efficiency information for the electronic circuitry design responsive to performing the second simulation; and
scoring one or more of the electronic circuitry design, clock-gates of the electronic circuitry design, and gated-devices of the electronic circuitry design responsive to collecting the dynamic efficiency information.

26. The method of claim 25, wherein collecting dynamic efficiency information comprises collecting one or more of:
a number of clock cycles where a gated-device is active;
a number of cycles where a gated-device is static and a clock-gate corresponding to such gated-device is propagating a received clock; and
a number of gated-devices in a fan out of a clock gate.

27. The method of claim 25, wherein the generating the first simulation commands for simulating the electronic circuitry design responsive to the identified logic cells comprises:

identifying clock gates described in the logic cells; and
generating the first simulation commands responsive to the identified clock gates.

28. The method of claim 25, wherein the generating the first simulation commands responsive to identified clock gates comprises generating simulation commands for simulating signaling changes at the identified clock gates.

29. The method of claim 25, wherein identifying clock gate behavior responsive to performing the first simulation comprises identifying sampling frequencies for performing a simulation of clock gates and gated-devices of the electronic circuitry design.

30. The method of claim 25, wherein generating second simulation commands for simulating the electronic circuitry design responsive to identifying the clock gate behavior comprises:

generating simulation commands for simulating clock gates and gated-devices of the electronic circuitry design using a sampling frequency.

31. The method of claim 28, wherein generating simulation commands for simulating signaling changes at the identified clock gates comprises: generating the simulation commands for simulating signaling changes at the identified clock gates but not for simulating signaling changes at other devices the electronic circuitry design.

32. The method of claim 29, wherein identifying sampling frequencies for performing the simulation of the clock gates and the gated-devices of the electronic circuitry design comprises:

identifying a lowest clock frequency and a highest clock frequency during an analysis period; and
determining a second clock frequency responsive to the identifying the lowest clock frequency and the highest clock frequency during the analysis period.

33. The method of claim 29, wherein identifying sampling frequencies for performing the simulation of the clock gates and the gated-devices of the electronic circuitry design comprises:

identifying all clock frequencies during an analysis period; and
determining a least-common multiple clock frequency responsive to identifying all clock frequencies during the analysis period.

34. The method of claim 32, wherein determining the second clock frequency responsive to the identifying the lowest clock frequency and the highest clock frequency during the analysis period comprises:

identifying a multiple of the lowest clock frequency that is the same or higher to the highest clock frequency; and
defining the second clock frequency responsive to identifying the multiple of the lowest clock frequency.

\* \* \* \* \*

UNITED STATES PATENT AND TRADEMARK OFFICE
CERTIFICATE OF CORRECTION

PATENT NO. : 11,112,819 B2  
APPLICATION NO. : 16/228445  
DATED : September 7, 2021  
INVENTOR(S) : Amund Aune et al.

Page 1 of 1

It is certified that error appears in the above-identified patent and that said Letters Patent is hereby corrected as shown below:

In the Specification

Column 18,  Line 59,  change "Byway of" to --By way of--

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*